United States Patent [19]

Miyaoh

[11] Patent Number: 4,979,758
[45] Date of Patent: Dec. 25, 1990

[54] STEEL LAMINATE GASKET WITH FLUID HOLE CLOSING DEVICE

[75] Inventor: Yoshio Miyaoh, Tokyo, Japan

[73] Assignee: Ishikawa Gasket Co., Ltd., Tokyo, Japan

[21] Appl. No.: 340,645

[22] Filed: Apr. 20, 1989

[30] Foreign Application Priority Data

Apr. 22, 1988 [JP] Japan ............................ 63-53531[U]

[51] Int. Cl.$^5$ .............................................. F16J 15/08
[52] U.S. Cl. ................................................ 277/235 B
[58] Field of Search .................... 277/235 B, 236, 213, 277/234, DIG. 10

[56] References Cited

U.S. PATENT DOCUMENTS

| | | | |
|---|---|---|---|
| 4,505,486 | 3/1985 | Skrycki | 277/235 B |
| 4,653,761 | 3/1987 | Baugh et al. | 277/235 B |
| 4,714,260 | 12/1987 | Udagawa | 277/235 B |
| 4,750,749 | 6/1988 | Nicholson | 277/213 X |
| 4,807,892 | 2/1989 | Udagawa . | |

FOREIGN PATENT DOCUMENTS

| | | | |
|---|---|---|---|
| 1367422 | 5/1962 | France | 277/235 B |
| 103662 | 7/1986 | Japan | 277/235 B |

Primary Examiner—Allan N. Shoap
Assistant Examiner—Scott Cummings
Attorney, Agent, or Firm—Kanesaka and Takeuchi

[57] ABSTRACT

A steel laminate gasket of the invention is installed in an engine having at least one fluid hole to be closed. The gasket comprises a first plate, and at least one second plate situated adjacent to the first plate. The first plate is provided with at least one closing area corresponding to the fluid hole to be closed, and a stepped portion formed around the closing area so that the closing area projects outwardly from the first plate. The second plate is located at a side where the closing area projects. The second plate includes sealing device around the fluid hole. The sealing device is located outside the stepped portion when the first and second plates are assembled together.

8 Claims, 1 Drawing Sheet

4,979,758

STEEL LAMINATE GASKET WITH FLUID HOLE CLOSING DEVICE

BACKGROUND OF THE INVENTION AND RELATED ART STATEMENT

The present invention relates to a steel laminate gasket with a fluid hole closing device for closing fluid hole of an engine.

In an internal combustion engine, there are provided with fluid passages for water and oil. In particular, the water and oil passages are formed inside a cylinder block and cylinder head, and when the engine is assembled together, water and oil are designed to circulate through the respective passages. When the cylinder block and cylinder head are assembled, a gasket is installed therebetween to prevent fluid from leaking at a connecting portion.

In an automobile industry, one engine is installed in different models of cars to reduce manufacturing cost of an engine. Even if the same engine is installed, installation condition is different in the respective models. Therefore, small design changes of an engine are required in the respective models. For example, amount of cooling water and oil circulating through the engine is changed.

In some cases, it is required that some of the water and oil passages be closed completely. In this case, it is possible to fill some materials in the hole or apply closing device, such as a cap, in the hole. However, filing some materials or applying a closing device requires additional materials and labor. Therefore, it has been proposed that the fluid passages be closed by means of a gasket. Namely, a gasket does not have a hole at a portion where the fluid passage is closed.

When a fluid passage is closed by a gasket, it is required to securely seal around the fluid passage. In a steel laminate gasket, sealing around the fluid passage may be made by a bead formed on a steel plate. In this case, the steel plate should have a thickness between 0.2–0.3 mm. Otherwise, the bead can not sufficiently seal around the fluid hole.

In case a steel plate having a thickness between 0.2–0.3 mm is used to block or close a fluid passage of an engine, if a pressurized fluid is applied to the steel plate, the steel plate may deform or project rearwardly, which affects the sealing ability around the fluid hole. Namely, in case a plate is deformed, fluid may leak from the fluid hole.

Accordingly, one object of the invention is to provide a steel laminate gasket with a fluid hole closing device, which can securely close a fluid hole for a pressurized fluid.

Another object of the invention is to provide a steel laminate gasket as stated above, wherein even if high fluid pressure is applied to the steel plate, the steel plate does not substantially deform to thereby seal around the fluid hole.

Further objects and advantages of the invention will be apparent from the following description of the invention.

SUMMARY OF THE INVENTION

In accordance with the present invention, a steel laminate gasket is installed in an internal combustion engine having at least one fluid hole to be closed. The gasket securely closes the fluid hole and prevents fluid from leaking.

The steel laminate gasket of the invention comprises a first plate, and at least one second plate situated adjacent to the first plate. The first plate is provided with at least one closing area corresponding to the fluid hole to be closed, and a stepped portion formed around the closing area. The closing area projects outwardly from the first plate.

The second plate is located at a side where the closing area projects. The second plate includes sealing means around the fluid hole, which is located outside the stepped portion when the first and second plates are assembled together. The sealing means may be a bead having a height greater than the height of the stepped portion.

The second plate may include a hole inside the sealing means. Also, a third plate may be situated under the second plate. The area around the fluid hole may be sealed by a plurality of beads.

When the gasket is installed between two engine parts, the bead and stepped portion are located outside the fluid hole, i.e. between the engine parts. In this condition, in case the engine parts are tightened, the bead and stepped portion are compressed by the engine parts. The bead forms a plurality of corrugated beads to seal around the fluid hole. The stepped portion also deforms to securely seal around the fluid hole. Since the stepped portion is formed, the rigidity of the first plate at the closing area increases. Therefore, in case pressurized fluid is applied, the closing area does not deform or project. As a result, the fluid hole is completely closed, and fluid does not leak from the fluid hole.

DETAILED DESCRIPTION OF PREFERRED EMBODIMENTS

Figure 1:
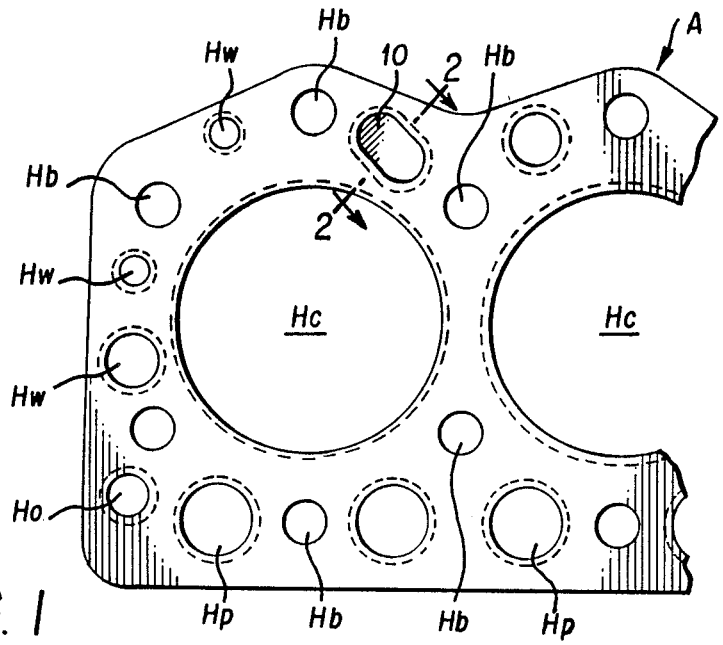
FIG. 1 is a partial plan view of a first embodiment of a steel laminate gasket of the invention.

Referring to FIG. 1, a first embodiment A of a steel laminate gasket of the present invention is shown. The gasket A is a cylinder head gasket and is provided with cylinder holes Hc, water holes Hw, oil holes Ho, bolt holes Hb and push rod holes Hp, as in the conventional gasket. Areas around the cylinder holes Hc, water holes Hw, oil holes Ho and push rod holes Hp are sealed by sealing means, as shown in dot lines in FIG. 1. In the present invention, the sealing means does not constitute the present invention. Any kind of sealing means may be used. Therefore, the sealing means is not explained any more.

Figure 2:
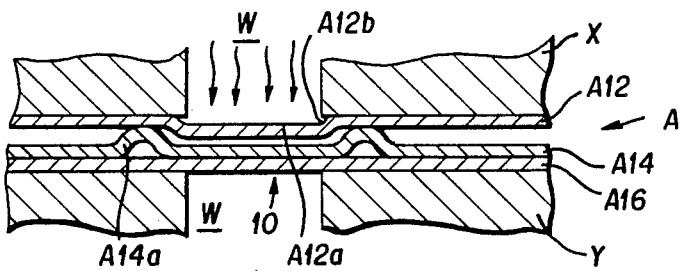
FIG. 2 is an enlarged section view taken along line 2—2 in FIG. 1, wherein the gasket is shown to be installed between two engine parts.

As shown in FIGS. 1 and 2, the gasket A includes a closed portion 10, which covers or closes water holes W of a cylinder head X and a cylinder block Y. The gasket A comprises an upper plate A12, an inner plate A14 and a lower plate A16.

The upper plate A12 is provided with a closing area A12a, and a stepped portion A12b around the closing area A12a. The closing area A12a projects downwardly from the rest of the plate. Since the stepped portion A12b is formed around the closing area A12a, the rigidity of the closing area A12a is enhanced. The inner plate A14 is provided with a bead A14a around the water holes W. The height of the bead A14a is higher than the height of the stepped portion A12b.

When the plates A12, A14, A16 are assembled together, the bead A14a is located outside the stepped portion A12b, and the closing area A12a is located at a distance away from the inner plate A14, as shown in FIG. 2. The stepped portion A12b is not located in the water holes W and is situated under the cylinder head X. In this condition, when the cylinder head X and cylinder block Y are tightened, the bead A14a, and stepped portion A12b are compressed. The bead A14a, therefore, forms a plurality of corrugated beads to seal around the water holes W. Also, the stepped portion A12b deforms to assist sealing around the water holes W.

When the gasket A is tightened, the height of the bead A14a decreases. Therefore, the closing area A14a substantially abuts against the inner plate A14. Namely, the plates A12, A14, A16 pile at the closed portion 10. In addition to this, the rigidity of the upper plate A12 at the closing area A12a is increased by the stepped portion A12b. Therefore, even if pressurized water is applied to the closed portion 10, the closed portion of the plates does not deform. Further, the stepped portion A12b and the bead A14a seal between the cylinder head X and cylinder block Y. Therefore, water does not leak into a space between the cylinder head X and the cylinder block Y.

In FIG. 2, pressurized water is applied to the gasket from the direction of the cylinder head X. However, pressurized water may be applied from the opposite direction. In the present invention, pressurized fluid hole is securely closed without leakage.

Figure 3:
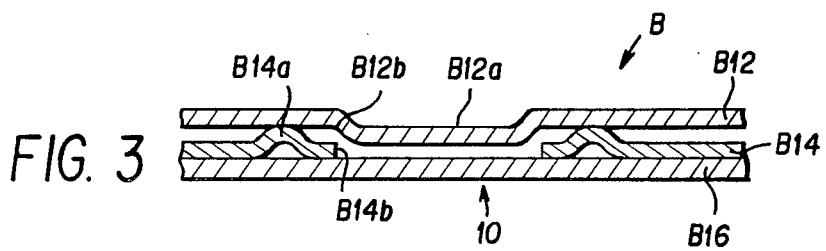
FIG. 3 is a section view, similar to FIG. 2, of a second embodiment of the steel laminate gasket of the invention.

FIG. 3 shows a second embodiment B of a steel laminate gasket of the invention. The gasket B comprises an upper plate B12 with a closing area B12a and a stepped portion B12b, an inner plate B14 with a bead B14a, and a lower plate B16, as in the gasket A. In the gasket B, however, the inner plate B14 further includes a hole B14b inside the bead B14a. The height of the stepped portion B12b is substantially the same as the height of the bead B14a.

When the plates B12, B14, B16 are assembled together, the closing area B12a is located above the hole B14b. When the gasket B is compressed, the closing area B12a substantially abuts against the lower plate B16. In the gasket B, the inner plate B14 used for a gasket without the closed portion 10 may be utilized. In the gasket B, the water holes W can be securely closed, as in the gasket A.

Figure 4:
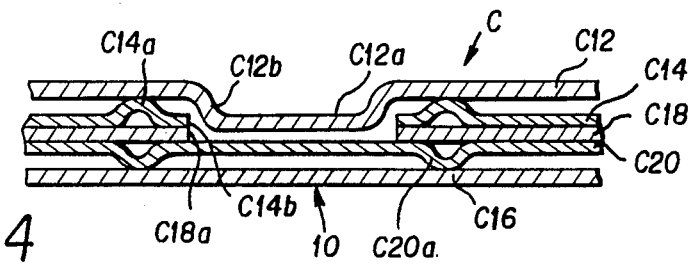
FIG. 4 is a section view, similar to FIG. 2, of a third embodiment of the steel laminate gasket of the invention.

FIG. 4 shows a third embodiment C of a steel laminate gasket of the invention. The gasket C comprises an upper plate C12 with a closing area C12a and a stepped portion C12b, an inner plate C14 with a bead C14a and a hole C14b, and a lower plate C16, as in the gasket B. The gasket C further includes an inner plate C18 with a hole C18a, and an inner plate C20 with a bead C20a. The height of the stepped portion C12b is greater than the height of the stepped portion B12b.

In the gasket C, when the gasket C is compressed, the plates C12, C16, C20 substantially abut against each other at the closed portion 10. The area around the water holes W is securely sealed by the beads C14a, C20a and the stepped portion C12b. The gasket C is suitable for the engine that requires thick gasket.

In the present invention, one plate is provided with a closing area with a stepped portion, and another plate is provided with sealing means or bead. An area around a water hole is securely sealed by the bead and the stepped portion when the gasket is compressed. Also, the rigidity of the closing area is enhanced by means of the stepped portion. Therefore, the gasket does not deform even if high pressurized fluid is applied to the gasket. In the present invention, the fluid hole can be closed without leakage of the fluid.

While the present invention has been explained with reference to the specific embodiments of the invention, the explanation is illustrative and the invention is limited only by the appended claims.

What is claimed is:

1. A steel laminate gasket adapted to be installed between two engine parts of an internal combustion engine having at least one fluid hole to be closed, comprising:

a first plate extending through a substantial area of the gasket and having at least one closing area corresponding to the fluid hole to be closed, and a stepped portion formed outside the closing area to surround the same so that the closing area projects outwardly from the first plate to thereby enhance rigidity of the closing area, and at least one second plate situated adjacent to the first plate at a side where the closing area projects, said second plate having sealing means comprising a bead outside an area corresponding to the fluid hole to surround the same, said sealing means being located outside the stepped portion and under the first plate when the first and second plates are assembled together, said sealing means and stepped portion, when installed in the engine, being located outside the fluid hole so that when the gasket is tightened, the sealing means and stepped portion are compressed by the engine parts, said sealing means strongly sealing around the fluid hole and the stepped portion being deformed to assist sealing around the fluid hole, rigidity of the closing area being enhanced by the deformation of the stepped portion to thereby substantially prevent deformation of the closing area by fluid.

2. A steel laminate gasket according to claim 1, wherein said sealing means is a first bead having height greater than height of the stepped portion so that when the first and second plates are compressed, the closing area substantially abuts against the second plate.

3. A steel laminate gasket according to claim 2, further comprising a third plate situated under the second plate.

4. A steel laminate gasket according to claim 1, further comprising a third plate situated under the second plate, said second plate having a hole so that when the gasket is tightened together, the stepped portion with the closing area is located in the hole.

5. A steel laminate gasket according to claim 4, wherein said sealing means is a second bead having height shorter than height of the stepped portion.

6. A steel laminate gasket according to claim 5, further comprising a fourth plate situated above the third plate and having a bead at a portion corresponding to the sealing means so that the bead seals around the fluid hole.

7. A steel laminate gasket adapted to be installed in an internal combustion engine having at least one fluid hole to be closed, comprising:
- a first plate having at least one closing area corresponding to the fluid hole to be closed, and a stepped portion formed around the closing area so that the closing area projects outwardly from the first plate, and
- at least one second plate situated adjacent to the first plate at a side where the closing area projects, said second plate having a first bead around the fluid hole, said first bead being located outside the stepped portion when the first and second plates are assembled together, said first bead having a height greater than height of the stepped portion so that when the first and second plates are compressed, the closing area substantially abuts against the second plate.

8. A steel laminate gasket adapted to be installed between two engine parts of an internal combustion engine having at least one fluid hole to be closed, comprising:
- a first plate extending through a substantial area of the gasket and having at least one closing area corresponding to the fluid hole to be closed, and a stepped portion formed outside the closing area to surround the same so that the closing area projects outwardly from the first plate to thereby enhance rigidity of the closing area,
- a second plate situated adjacent to the first plate at a side where the closing area projects, said second plate having sealing means comprising a bead outside an area corresponding to the fluid hole to surround the same and a hole inside the sealing means so that when the first and second plates are assembled, the stepped portion with the closing area is located inside the hole and said sealing means is located under the first plate, and
- a third plate situated under the second plate so that when the gasket is tightened together, the stepped portion and the sealing means are compressed by the engine parts, said sealing means strongly sealing around the fluid hole, the stepped portion being deformed to assist sealing around the fluid hole, rigidity of the closing area being enhanced by the deformation of the stepped portion, and the closing area abutting against the third plate to thereby substantially prevent deformation of the closing area by fluid.

* * * * *